Feb. 19, 1957 P. E. DE FORD 2,781,675
HYDRAULIC DRIVE
Filed Aug. 17, 1953 4 Sheets-Sheet 2
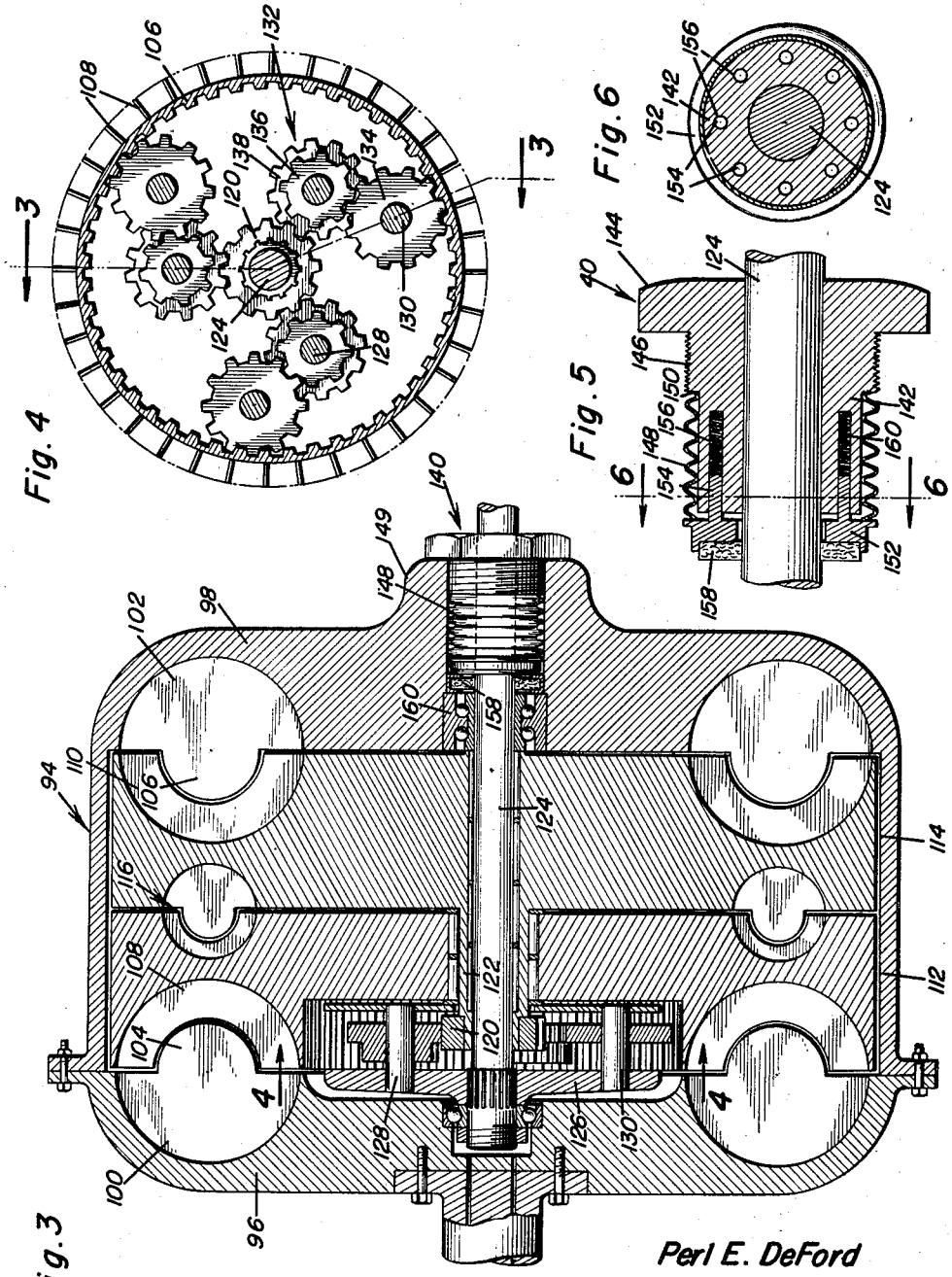
Perl E. DeFord
INVENTOR.

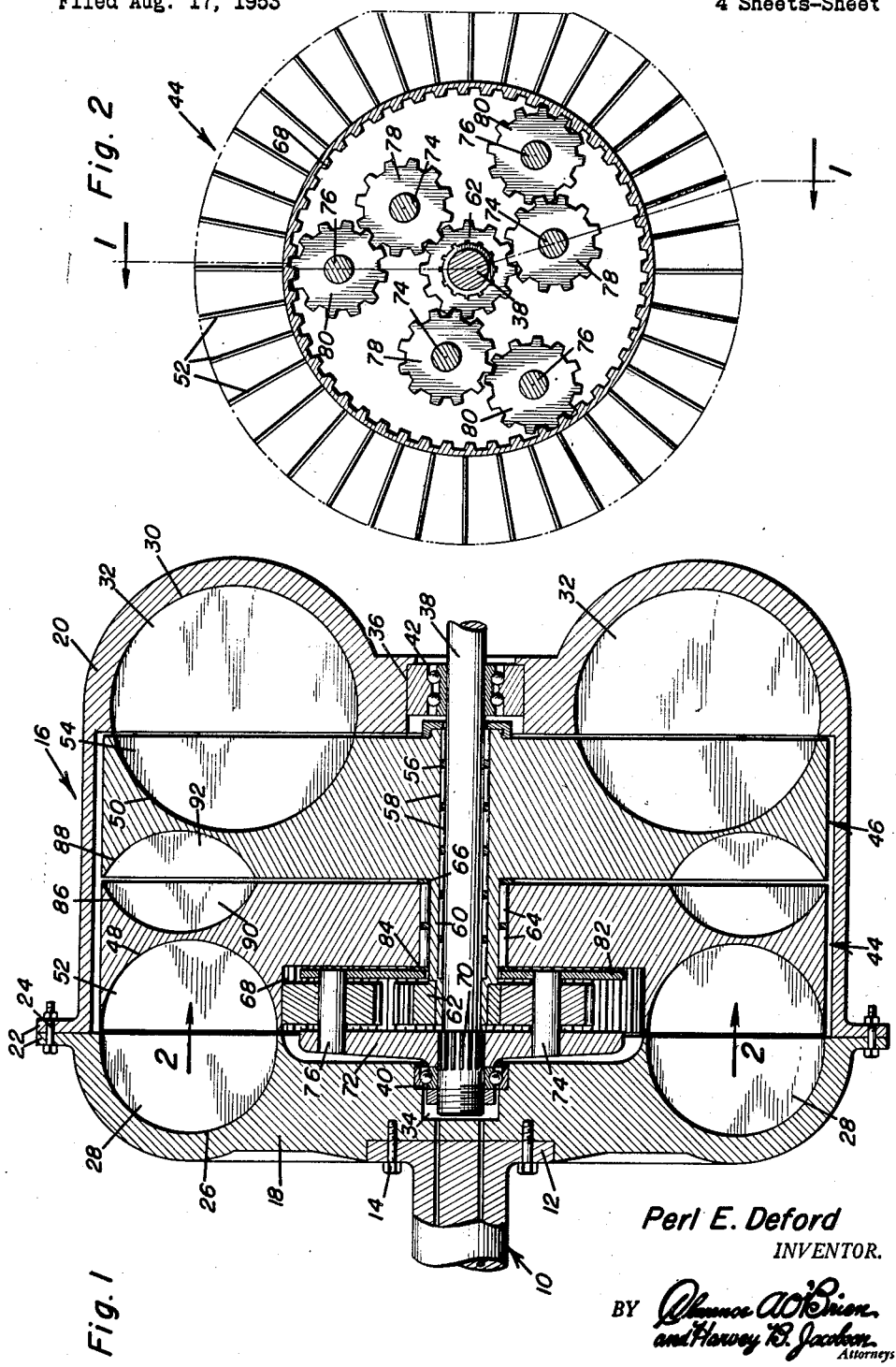

Feb. 19, 1957 P. E. DE FORD 2,781,675
HYDRAULIC DRIVE
Filed Aug. 17, 1953 4 Sheets-Sheet 3
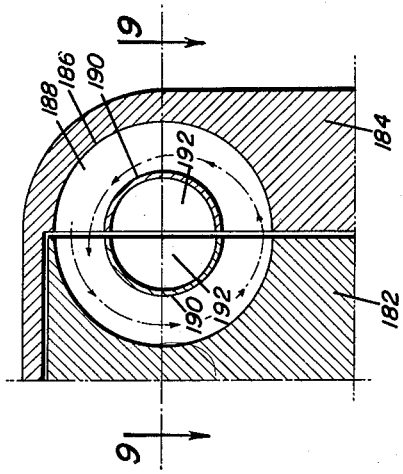
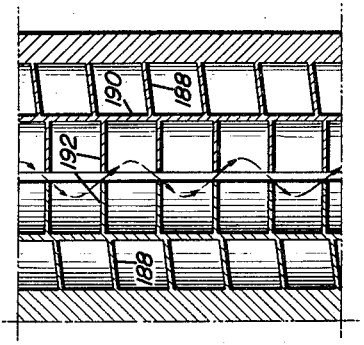
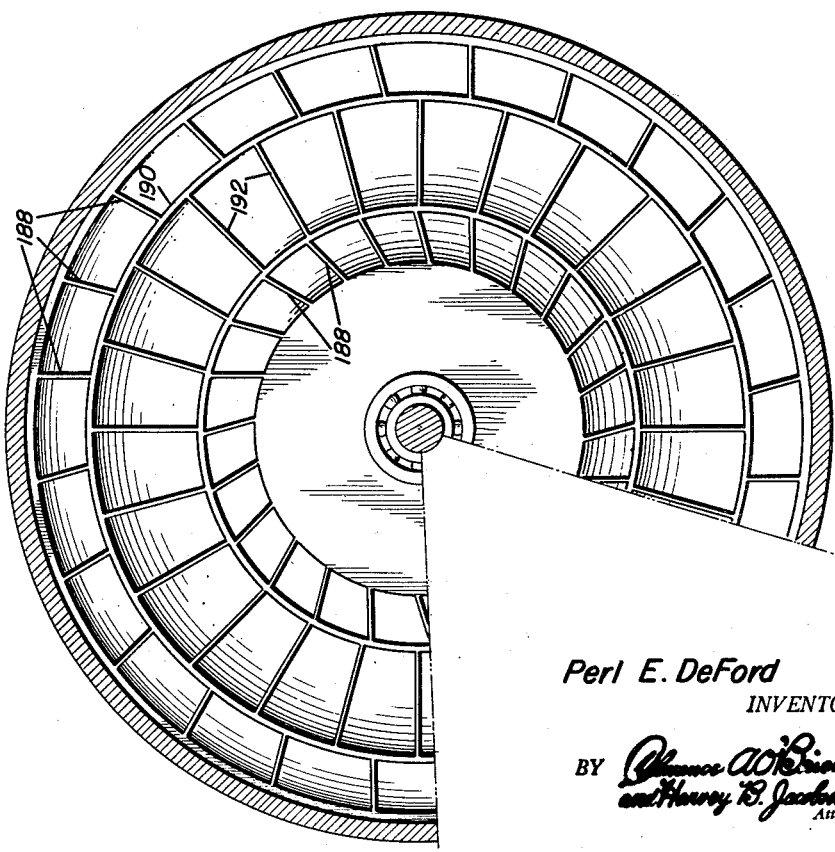
Perl E. DeFord
INVENTOR.
BY

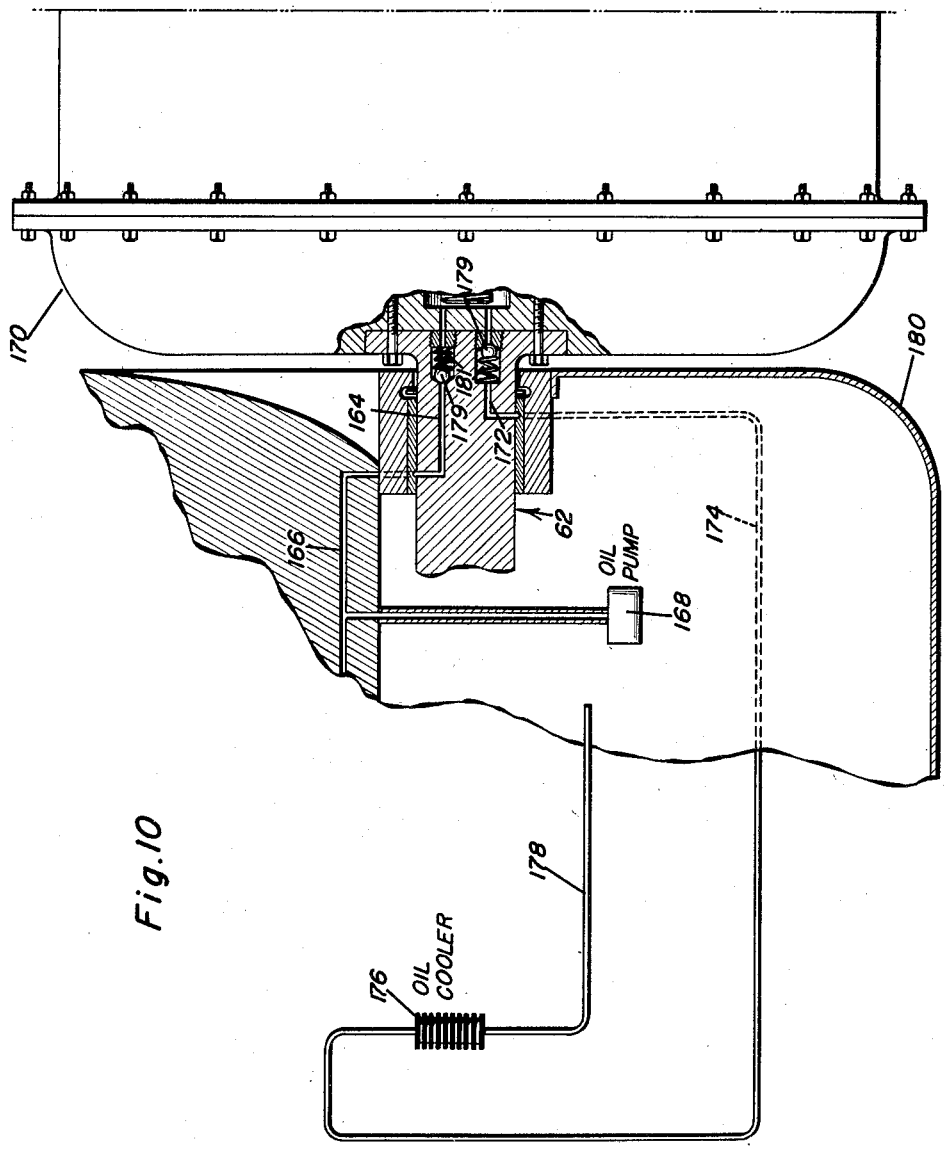

United States Patent Office 2,781,675
Patented Feb. 19, 1957

2,781,675

HYDRAULIC DRIVE

Perl E. De Ford, Twin Falls, Idaho, assignor of one-half to Emerson A. Tolman, Twin Falls, Idaho Application August 17, 1953, Serial No. 374,569

5 Claims. (Cl. 74—677)

This invention relates generally to transmission devices and pertains more particularly to an improved form of transmission of the automatic type particularly adapted for use in the automotive field.

As conventionally provided in automotive vehicles, a speed reducing transmission is interposed between the prime mover and propeller shaft for permitting variable speed ratios between the prime mover and the propeller shaft to satisfy the load demand as compared to the particular characteristics of the prime mover. It is well known that the power delivered by any rotary power plant is proportional to the product of the speed of the power plant and the torque of the output shaft, in other words, if either the speed or torque are varied by a given factor, the power delivered is varied in a like manner. It is for this reason that speed reduction transmissions are necessary inasmuch as it is desirable to permit the power plant to operate at sufficient speed to deliver the necessary power to the propeller shaft under any speed conditions of the latter.

At the present time, the manually controlled type or so-called standard transmissions are being more and more replaced by the automatic type to relieve the driver of the attention necessary for manual shifting. Although numerous types of automatic transmissions have been developed, their prime disadvantage resides in their high initial cost, complexity of design and consequent high cost of maintenance in addition to their rather large bulk.

It is therefore a primary object of this invention to provide an improved form of transmission having infinitely variable torque characteristics and which is small in size, compact in construction, and of light weight, the transmission being of the fully automatic type in that it requires no controlling mechanism to vary the gear ratio thereof.

Another object of this invention is to provide an improved transmission which incorporates hydro-dynamic couplings in conjunction with an improved system of planetary gearing obviating the need for either external or internal control devices and for use of such mechanism as overrunning clutches and the like.

Still another object of this invention is to provide an improved form of hydro-dynamic coupling.

A further object of this invention resides in the provision of a hydro-dynamic coupling assembly including a driver housing and a pair of runners, one of the runners including a ring gear and the other a sun gear with double planetary gearing employed therebetween for permitting rotation of the runners in the same direction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a longitudinal section taken through a transmission assembly constructed in accordance with this invention showing details of the internal construction thereof;

Figure 2 is a transverse vertical section taken substantially along the plane of section line 2—2 in Figure 1 showing details of the planetary gearing;

Figure 3 is a view similar to Figure 1 but showing a modified form of construction;

Figure 4 is a transverse vertical section taken substantially along the plane of section line 4—4 in Figure 3 showing details of the modified planetary gearing;

Figure 5 is a longitudinal sectional view taken through the oil seal assembly;

Figure 6 is a transverse vertical section taken substantially along the plane of section line 6—6 of Figure 5;

Figure 7 is a plan view of a modified form of hydrodynamic coupling elements;

Figure 8 is a vertical section taken through a portion of a hydro-dynamic coupling constructed in accordance with Figure 7;

Figure 9 is a horizontal section taken substantially along the plane of section line 9—9 of Figure 8; and Figure 10 is a side elevational view partly in section showing a portion of an internal combustion engine having the improved transmission mechanism secured thereto.

Referring now more particularly to Figure 1, reference numeral 10 indicates generally the crank shaft of an internal combustion engine which is provided at its ends with a radial flange 12 through which the fastening elements 14 extend for securing the housing assembly indicated generally by the reference character 16 thereto. The housing assembly includes a forward section 18 and a rearward section 20, each provided with a marginal flange 22 through which the fastening elements 24 extend for securing the two portions of the housing together. The inner face of the forward section 18 is provided with an annular groove 26 of semi-circular configuration in cross section and this groove has a series of circumferentially spaced radial vanes 28 formed or suitably secured therein. This groove and its associated vanes form a hydraulic driver at one end of the housing assembly 16. The opposite end of the housing is similarly provided with a groove 30 and associated radial vanes 32 so that this end of the housing also presents a hydraulic driver.

The inner face of the forward section 18 is provided with a recess 34 centrally thereof and the rearward section 20 is provided with a registering opening 36. A driven shaft 38 projects within the housing 16 through the opening 36 with its free end received within the recess 34 and suitable bearings 40 and 42 are provided for journaling this shaft within the housing. A pair of runner members, indicated generally by the reference characters 44 and 46 respectively are journaled within the housing on the driven shaft 38 and the opposite end faces of these runner members are provided with the annular grooves 48 and 50 and associated radial vanes 52 and 54 for cooperation with the aforementioned grooves and vanes 26, 28 and 30, 32 respectively, whereby rotation of the housing 16 will effect similar rotation of the runners.

The rear runner 46 is provided with a longitudinal bore 56 of slightly greater diameter than the driven shaft 38 so that the needle bearing member 58 may be utilized in journaling this runner of the driven shaft in the manner shown. The forward face of this runner 46 is provided with an extension or boss 60 which terminates flush with the front face of the runner member 44 and whose free end is splined for reception of the sun gear 62 in the manner shown. The runner member 44 is journaled through the medium of the needle bearing 64 on the boss 60 of the rear runner 46 and a spacing washer 66 is disposed between the adjacent end faces of the main body portions of the runners 44 and 46 so that these faces are disposed in slightly spaced relation. Likewise, the opposite end faces of the runner members are slightly spaced from the inner opposite end faces of the housing 16.

Referring to both Figures 1 and 2, it will be seen that the forward end face of the runner 44 is provided with a circular recess with its circumferential surface formed with teeth presenting the ring gear 68 and it will be noted that the free end of the driven shaft 38 is suitably splined as at 70 for receiving the spider member 72 carrying the inner and outer shaft members 74 and 76 respectively. An inner set of planet gears 78 are journaled on the inner shaft 74 and these planet gears mesh with the sun gear 62 in the manner shown most clearly in Figure 2, whereas the outer set of planet gears 80 journaled on the outer shaft 76 mesh with both the inner set of planet gears and the ring gear 68, so as to establish drive between the sun gear 62 and the ring gear 68, through the medium of the spider 72 orbitally carrying the two sets of planet gears, as will be manifest. By this construction, rotation of the drive shaft 10 in one direction effects the same rotation to all of the members 44, 46 and 38.

A retaining washer 82 and thrust washer 84 maintain the various planet gears in proper relation on their corresponding shaft 74 and 76.

The adjacent faces of the runner members 44 and 46 are provided with registering grooves 86 and 88 respectively and corresponding vane members 90 and 92 to effect a hydro-dynamic coupling action between these two runner members when they are rotating at different speeds.

Consideraing a vehicle at rest and during initial acceleration, it will be seen that the driven shaft 38 and spider 72 will be stationary whereas the crank shaft 10 and consequently the housing 20 will be rotated at a relatively high angular velocity causing considerable torque to be imparted through the hydro-dynamic couplings to the runner members 44 and 46. Since the spider 72 is at rest, the runner 44 will rotate relatively slowly whereas the runner 46 will rotate faster due to the gear reduction through the planet gears to the ring gear. At this point, the relative speed of rotation between the runners 44 and 46 will be at a maximum so that the torque imparted therebetween due to their hydro-dynamic coupling will also be at a maximum, the net over-all effect being that the maximum torque is imparted to the driven shaft 38 when the same is maintained in a stationary position. As the vehicle is accelerated and the driven shaft 38 is speeded up, the difference in relative rotation between the runners 44 and 46 will be lessened until such time as these runner members are rotating at the same speed wherein the planetary system is locked up or effects a straight-through drive, the only speed reduction between the crank shaft 10 and the driven shaft 38 occurring due to slippage between the hydro-dynamic couplings between the housing 16 and the runner members 44 and 46. It will be noted that the couplings between the housing 16 and the rear runner 46 is of larger area than the front coupling so that the former imparts more torque which is particularly beneficial during low vehicle speed-high torque demand.

Referring now more particularly to Figures 3 and 4, it will be seen that the transmission incorporates the housing indicated generally by the reference character 94 having the forward and rear sections 96 and 98 respectively, wherein the vane element 100 and 102 include the semicircular extension 104 and 106 cooperating with the half ring vanes 108 and 110 in the runner assemblies indicated generally by the reference characters 112 and 114 respectively. The hydraulic coupling 116 between the runner members 112 and 114 is similarly formed. The provision of this double set of vane members effects a more efficient transfer of energy.

The ring gear 118 is formed in the recess in the runner 112 and the sun gear 120 is secured to the free end of the boss 122 of the runner 114, the runners being journaled on the drive shaft 124. The spider 126 is splined to the inner end of the drive shaft 124 and carries the inner and outer shafts 128 and 130 which rotatably receive the planet gear assemblies 132 and the planet gears 134 respectively. The outer set of planet gears 134 mesh with the ring gear 118 and the inner planet gear assemblies 132 incorporate stepped gears 136 and 138, the former of which mesh with the outer planet gears 134 and the latter of which mesh with the sun gear 120 in the manner shown most clearly in Figure 4, this manner of gearing permitting a reduced over-all diameter of the transmission housing assembly.

An oil seal assembly indicated generally by the reference character 140 is provided at the rear side of the housing 94 and this seal incorporates a plug member 142 having an enlarged head 144 and a threaded shoulder portion 146 engaged within the boss 148 on the rear side of the housing. The free end of the plug is provided with a portion of reduced diameter about which the corrugated sleeve 148 is concentrically disposed with one end thereof in abutment with the face 150 and the other end in engagement with the packing washer 152 provided with the guide fingers 154 received in the longitudinal recesses 156 in the plug. The packing material 158 is disposed between the bearing 160 and the washer 152 so that as the plug is threaded inwardly of the housing, the sleeve 148 will be deformed in accordion fashion along its surface so as to be forced against the adjacent inner surface of the housing. The springs 160 normally maintain the washer 152 in extended position.

Referring now more particularly to Figure 10, it will be seen that the crank shaft 162 is provided with a longitudinal bore 164 communicating with the galley passage 166 in the engine block and being supplied with oil under pressure from the pump 168 so that engine oil is pumped into the transmission assembly 170 through this passage 164. The oil is returned or forced out of the assembly 170 through the return line 172 in the form of a longitudinal bore in the crank shaft to a line 174 extending to the oil cooler 176 and from there through the return line 178 to the engine oil pan 180. In this manner, the oil within the transmission 170 will be maintained at a substantially constant temperature.

In order to retain the proper amount of oil in the transmission assembly, a ball valve 179 is provided in each of the passages 164 and 172 and the springs 181 coacting therewith operate to provide check valves in these passages, thereby preventing the oil from running out of the transmission when the engine is not operating.

Referring now more particularly to Figures 7–9, an improved form of hydraulic coupling assembly is shown which is incorporated between the runner 182 and the housing 184 or between the two runners, this coupling incorporating an annular groove 186 in each of the members 182 and 184 into which the half ring blade members 188 are secured in the manner shown most clearly in Figures 7 and 8. In this manner, the members 182 and 184 form annular passageways for circulation of oil therethrough in the manner shown by the arrows in Figure 8 such that the flow of oil will be in a helical path. Annular trough members 190 are secured to the vane 188 and these troughs are preferably of semicircular configuration in cross section and are provided with the radial semicircular deflector plate 192, in the manner shown. As indicated by the arrows in Figure 9, it will be seen that the flow path of the oil as affected by the trough members 190 and their vanes or deflector plates 192 is in the form of a corrugated strip. In this manner, a maximum of efficiency is obtained in imparting drive between the members 182 and 184, as will be manifest.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A power transmission device comprising a drive shaft, a housing secured to said drive shaft, having its opposite ends presenting impellers, a driven shaft journaled within said housing, a first runner member having a cylindrical main body portion and a longitudinally projecting boss, said runner member having a longitudinal bore receiving said driven shaft, a second runner member having a main body portion of cylindrical configuration, the second runner member being journaled on said boss, the end face of the second runner member opposite the first runner member being recessed, an internal ring gear formed in that portion of the second runner member defining said recess, a sun gear secured to the free end of said boss, a first set of planet gears meshing with said sun gear, a second set of planet gears meshing with said ring gear, means for imparting rotation of one set of planet gears to the other set of planet gears, and a spider secured to said driven shaft and supporting both sets of planet gears for orbital rotation thereof, the adjacent faces of said first and second runner members each being provided with an annular groove, vane members in said grooves whereby the first and second runner members are hydraulically coupled, the recessed end face of said second runner member and the opposite end face of said first runner member each being provided with an annular groove, vane members in the last mentioned grooves in opposed relation to said impellers, whereby said housing and said first and second runners are hydraulically coupled.

2. A power transmission device comprising a drive shaft, a housing secured to said drive shaft, having its opposite ends presenting impellers, a driven shaft journaled within said housing, a first runner member having a cylindrical main body portion and a longitudinally projecting boss, said runner member having a longitudinal bore receiving said driven shaft, a second runner member having a main body portion of cylindrical configuration, the second runner member being journaled on said boss, the end face of the second runner member opposite the first runner member being recessed, an internal ring gear formed in that portion of the second runner member defining said recess, a sun gear secured to the free end of said boss, a first set of planet gears meshing with said sun gear, a second set of planet gears meshing with said ring gear and the first set of planet gears, and a spider secured to said driven shaft and supporting both sets of planet gears for orbital rotation thereof, the adjacent faces of said first and second runner members each being provided with an annular groove, vane members in said grooves whereby the first and second runner members are hydraulically coupled, the recessed end face of said second runner member and the opposite end face of said first runner member each being provided with an annular groove, vane members in the last mentioned grooves in opposed relation to said impellers, whereby said housing and said first and second runners are hydraulically coupled.

3. A power transmission device comprising a drive shaft, a housing secured to said drive shaft, having its opposite ends presenting impellers, a driven shaft journaled within said housing, a first runner member having a cylindrical main body portion and a longitudinally projecting boss, said runner member having a longitudinal bore receiving said driven shaft, a second runner member having a main body portion of cylindrical configuration, the second runner member being journaled on said boss, the end face of the second runner member opposite the first runner member being recessed, an internal ring gear formed in that portion of the second runner member defining said recess, a sun gear secured to the free end of said boss, a first set of planet gears meshing with said sun gear, a second set of planet gears comprising integral pairs of gears, one gear of each pair meshing with said ring gear and the other gear of each pair meshing with the first set of planet gears, and a spider secured to said driven shaft and supporting both sets of planet gears for orbital rotation thereof, the adjacent faces of said first and second runner members each being provided with an annular groove, vane members in said grooves whereby the first and second runner members are hydraulically coupled, the recessed end face of said second runner member and the opposite end face of said first runner member each being provided with an annular groove, vane members in the last mentioned grooves in opposed relation to said impellers, whereby said housing and said first and second runners are hydraulically coupled.

4. In a hydraulic coupling assembly, a driver and a runner having adjacent parallel surfaces, each of said surfaces being provided with an annular groove of semicircular cross section, a set of semicircular vanes disposed in circumferentially spaced relation within each of said grooves, each set of said vanes having registering notches in their inner edges, an annular trough member secured within the notches in each set of vanes, and circumferentially spaced deflector plates secured within said trough members and arranged at an angle to said semi-circular vanes.

5. The combination of claim 4 wherein said trough members are of semicircular cross section, the free edges of said deflector plates in corresponding trough members being disposed in closely spaced relation.

References Cited in the file of this patent

UNITED STATES PATENTS

| | | |
|---|---|---|
| 2,350,416 | Perry | June 6, 1944 |
| 2,385,058 | Buthe | Sept. 18, 1945 |
| 2,385,059 | Buthe | Sept. 18, 1945 |
| 2,630,023 | Stigers et al. | Mar. 3, 1953 |
| 2,645,136 | Neal | July 14, 1953 |
| 2,652,782 | Herndon et al. | Sept. 22, 1953 |

FOREIGN PATENTS

| | | |
|---|---|---|
| 407,146 | Great Britain | Mar. 15, 1934 |
| 974,187 | France | Sept. 27, 1950 |
| 983,917 | France | Feb. 2, 1951 |